United States Patent
Saru et al.

(10) Patent No.: US 10,876,845 B2
(45) Date of Patent: Dec. 29, 2020

(54) PERSONALIZED SMART NAVIGATION FOR MOTOR VEHICLES

(71) Applicant: Intel Corporation, Santa Clara, CA (US)

(72) Inventors: Stefan Saru, Shannon (IE); Swati Sehgal, Shannon (IE); Laura Hunt, Meelick (IE); Ivan Coughlan, Castleconnell (IE)

(73) Assignee: Intel Corporation, Santa Clara, CA (US)

( * ) Notice: Subject to any disclaimer, the term of this patent is extended or adjusted under 35 U.S.C. 154(b) by 819 days.

(21) Appl. No.: 15/197,585

(22) Filed: Jun. 29, 2016

(65) Prior Publication Data

US 2018/0003515 A1 Jan. 4, 2018

(51) Int. Cl.
 *G01C 21/34* (2006.01)
 *G05D 1/00* (2006.01)
 (Continued)

(52) U.S. Cl.
 CPC ..... *G01C 21/3415* (2013.01); *G01C 21/3461* (2013.01); *G01C 21/3484* (2013.01); *G01C 21/3492* (2013.01); *G01S 19/39* (2013.01); *G01S 19/393* (2019.08); *G05D 1/0088* (2013.01); *G07C 5/0808* (2013.01); *G07C 5/0825* (2013.01); *G05D 2201/0213* (2013.01)

(58) Field of Classification Search
 CPC ............ G01C 21/3415; G01C 21/3461; G01C 21/3484; G01C 21/3492; G01S 19/39; G01S 19/393; G05D 1/0088; G05D 2201/0213; G07C 5/0808; G07C 5/0825
 See application file for complete search history.

(56) References Cited

U.S. PATENT DOCUMENTS

| | | | |
|---|---|---|---|
| 6,512,976 B1 | 1/2003 | Sabatino et al. | |
| 2012/0078509 A1* | 3/2012 | Choi | G01C 21/3415 701/423 |

(Continued)

FOREIGN PATENT DOCUMENTS

EP 2037219 A1 3/2009

OTHER PUBLICATIONS

PCT International Search Report and The Written Opinion of the International Searching Authority for PCT/US2017/030604 dated Aug. 16, 2017.

*Primary Examiner* — Robert T Nguyen
(74) *Attorney, Agent, or Firm* — Hanley, Flight & Zimmerman, LLC

(57) ABSTRACT

Embodiments are generally directed to personalized smart navigation for motor vehicles. An embodiment of a smart navigation system for a motor vehicle includes a plurality of sensors of the motor vehicle to detect internal conditions, external conditions, or both for a motor vehicle; a controller to receive sensor data from the plurality of sensors, the sensor data including vehicle condition data, external conditions data, or both; and a navigation system to determine a route for an operator of the motor vehicle. Determination of the route by the navigation system is based at least in part on current conditions data received from a plurality of sources, the current conditions data including the navigation data for the navigation system and sensor data from the plurality of sensors.

23 Claims, 7 Drawing Sheets

(51) Int. Cl.
    *G07C 5/08*    (2006.01)
    *G01S 19/39*   (2010.01)

(56) References Cited

U.S. PATENT DOCUMENTS

| | | |
|---|---|---|
| 2012/0179361 A1 | 7/2012 | Mineta et al. |
| 2012/0283899 A1 | 11/2012 | Miyamoto et al. |
| 2016/0113565 A1 | 4/2016 | Lee et al. |
| 2017/0270797 A1* | 9/2017 | Lee .................. H04W 4/46 |
| 2017/0359519 A1* | 12/2017 | Hardy ................ B60K 35/00 |
| 2017/0364869 A1* | 12/2017 | Tarte ............... G06Q 10/1095 |
| 2018/0268624 A1* | 9/2018 | Remboski ......... B60W 50/045 |
| 2019/0154453 A1* | 5/2019 | Leone ............. G05D 1/0088 |

\* cited by examiner

PERSONALIZED SMART NAVIGATION FOR MOTOR VEHICLES

TECHNICAL FIELD

Embodiments described herein generally relate to the field of electronic devices and, more particularly, personalized smart navigation for motor vehicles.

BACKGROUND

In the operation of modern motor vehicles, there are numerous data sources that assist in vehicle operation. For example, there are commonly diagnostic systems that provide data regarding vehicle operations and required repairs that may be required, with the variety and depth of such information increasing with the improvement in data sophistication of motor vehicles. In certain instances, such data may be recorded for later recovery for vehicle repairs, or in some instances may be transmitted by a cellular connection to allow collection by the vehicle manufacture to remotely diagnose issues.

Further, in vehicle operation GPS (Global Positional System) navigation systems have become common, either in integrated within the In Vehicle Infotainment (IVI) system of a vehicle or as provided by an external device having GPS capability.

However, the determination of what to do with the increasing amount of information related to motor vehicle operation is generally left to the vehicle operator. As a result, the operation of a motor vehicle in some instances has become more difficult as the operator is faced with an increased quantity of information from an increasing number of sources, which can further distract the motor vehicle operator from the actual control of the vehicle, and may potentially make a driver less rather more safe in operating the vehicle.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
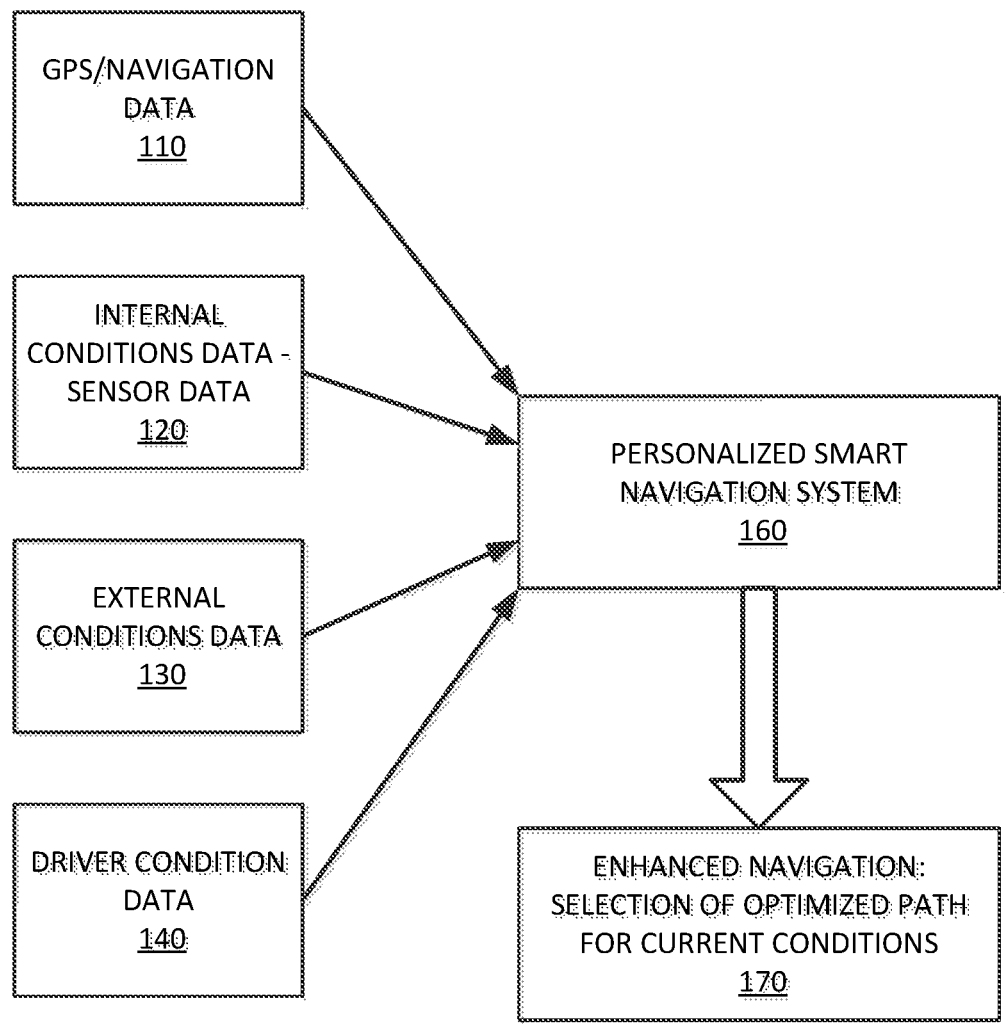
FIG. 1 is an illustration of generation of an optimized path by a personalized smart navigation system according to an embodiment.

Embodiments described herein are generally directed to personalized smart navigation for motor vehicles.

For the purposes of this description:

"Operator" refers to a human or automated system that is controlling operation of a motor vehicle. The term "operator" includes a human driver of a motor vehicle, which may generally be referred to as a "driver" herein. A motor vehicle may include both an automated system operator and a human driver, such as in an operation in which an automated operator may take over control of a motor vehicle in certain conditions.

"Motor vehicle" or "vehicle" refers to a motorized land vehicle that is not operated on rails. The term "motor vehicle" includes any automobile, truck, bus, motorcycle, or other similar motorized vehicle. The term "motor vehicle" includes both a vehicle operated by a human driver and a vehicle operated by an automated system, commonly referred to as an autonomous vehicle or self-driving car.

"External device or system" refers to a device or system separate from a motor vehicle that is linked by a wireless or wired interface with the motor vehicle. External devices or systems include, but are not limited to, smart phones, tablet computers, standalone navigation devices, and other mobile electronic devices. External devices or systems may also include radio networks providing data to a motor vehicle and data from other nearby vehicles.

In operation of a motor vehicle, the conventional collection of vehicle function data from sensors and presentation of GPS data from a navigation system together suffer from a general deficiency in that such systems provide little assistance in instructing a vehicle operator how to combine such information in the most efficient and safe manner.

In some embodiments, data regarding vehicle operation are combined in an intelligent fashion to provide personalized smart navigation to an operator of the motor vehicle. In some embodiments, personalized smart navigation utilizes data from multiple sources to provide enhanced navigation for current conditions. In some embodiments, a personalized smart navigation system may provide navigation guidance to either or both of a human driver of a motor vehicle or an automated operator of a motor vehicle, with the form of the navigation guidance depending on the operator of the motor vehicle.

Stated in another manner, a deficiency in navigation is addressed in directing navigation to an optimized path in consideration of collected sensor data, wherein the optimized path is not necessarily the shortest or quickest path but rather a path that takes into consideration the current conditions.

In some embodiments, a personalized smart navigation system operates to both improve driver experience in operating a motor vehicle, and to improve transportation safety by guiding navigation towards safe alternatives under the current conditions. In some embodiments, current conditions include one or more of a current location as determined by GPS or other navigation data; internal conditions such as vehicle condition as determined by motor vehicle sensor data; external conditions, which may include weather, daylight, and road conditions, as determined by sensor data, external data sources, or other data sources; and driver condition as determined by sensor data, stored medical data, or other data sources.

In a first example, when driving with a vehicle malfunction such as signal indicator malfunction on the left hand side that is detected by a vehicle sensor, the driver may be advised to drive to the nearest garage of service facility. However, the driver may or may not be able to obtain service depending on, for example, the urgency of the travel plans, the time of day, and the remoteness of the current location. In some embodiments, a route determined by the GPS system is a route selected at least in part to address the motor vehicle fault. In this particular example, an embodiment of a personalized smart navigation system may guide the driver by using a path involving the fewest number of left turns to reduce the need to provide left turn signals. In some embodiments, the navigation system may further provide verbal reminders to the driver of the need to provide a hand signal for a left turn if avoiding a left turn is not possible or is not practical on the current travel route.

In a second example in which sensor data indicates a possibility of a more serious vehicle condition, such as increasing vehicle temperature or possible brake malfunction, the personalized smart navigation system may, for example, guide the vehicle operator away from limited access highways or freeways or other locations which a vehicle breakdown would result in a dangerous condition.

In a third example in which an operator is driving at night, in sensor detected weather conditions in which visibility is reduced, such as rain, snow, or fog conditions, or both, then the personalized smart navigation system may guide the operator to major roads, and avoid minor roads where it is possible to encounter difficulties due to road quality and reduced visibility. In some embodiments, a route determined by the GPS system is a route selected at least in part to address the external condition, such as a hazardous weather condition or a road condition.

As illustrated is such example, a path established by a personalized smart navigation system is not necessarily the shortest or quickest path, but rather is the most suitable and safe path based on the current circumstances.

In some embodiments, the vehicle sensor and GPS data may be further enhanced by driver data (for a human operator of a motor vehicle) including data regarding the current driver condition, including driver fatigue based on a length of time a driver has been operating the vehicle without a break and whether the driver appears to be drowsy. In circumstances in which there appears to be a likelihood of driver fatigue, the personalized smart navigation system may guide the driver to roads having facilities that may allow the driver to rest before proceeding further.

In some embodiments, the driver data may include personalized driver data regarding the driver medical conditions and physical limitations in order to utilize such data in providing smart navigation that is tailored to the individual operator. For example, if the personalized driver data includes an indication that the driver has limited night vision, the personalized smart navigation system may guide the operator to roads having good quality lighting, and avoiding dark roads that may be more difficult for the driver.

FIG. 1 is an illustration of generation of an optimized path by a personalized smart navigation system according to an embodiment. In some embodiments, a smart navigation system for a motor vehicle 160 is to receive current conditions data from multiple sources and, based at least in part on such current conditions data, provide for enhanced navigation by selecting an optimized path for the current conditions 170.

In some embodiments, a first source of data may be GPS or other navigation data 110, wherein the navigation data 110 includes, for example, data regarding a current location, data identifying an intended destination, and data regarding the roads, highways, and other transportation links in the vicinity of the current location.

In some embodiments, a second source of data may be internal condition data including vehicle sensor data 120. In some embodiments, the vehicle sensor data includes any sensor data regarding the condition and operation of the motor vehicle. In some embodiments, the sensor data may include data describing whether any vehicle elements have a fault (such as a signal light or headlight that has failed, a flat tire, including a run flat tire with a limited road life, a leakage that is detected, or other vehicle fault) or are otherwise operating outside normal boundaries or thresholds (such as a tire pressure that is low, a cooling system problem resulting in an engine temperature that is high, a fluid level that is outside of normal standards, or a fuel or charging level that is low). In some embodiments, internal condition data may also include detection of faulty sensors, wherein the faulty sensors may prevent the detection of vehicle faults.

In some embodiments, a third source of data includes external conditions data 130, wherein the external conditions may include weather conditions, road conditions, daylight or moonlight conditions, or other external conditions that affect the operation of a motor vehicle. In some embodiments, external conditions data includes data obtained from vehicle sensors, data obtained from external devices, or both. In some embodiments, data from external devices or systems may be utilized to supplement or corroborate vehicle sensor data (such as weather data utilized to corroborate road conditions sensed by the vehicle sensors).

In some embodiments, a fourth source of data includes driver condition data 140 in circumstances in which the operator is a human driver. In some embodiments, the driver condition data may include evidence of drowsiness of the driver, amount of time the driver has been operating the motor vehicle, medical data for the driver including any physical limitations the driver has, and other data regarding a condition of the driver. In some embodiments, other driver condition data may include driver preferences, prior experience of the driver on any specific road, and the manner in which the driver is driving (such as detection of driving that is indicative of a driver who is uncomfortable with the conditions, such as abrupt braking or handling of the motor vehicle).

In some embodiments, the determination of an optimized route by the navigation system may utilize any combination of such available sources of information 110-140 as required to address the current conditions.

In some embodiments, data for personalized smart navigation includes data obtained from multiple sources by distributed data mining, including data from sources inside and outside of the motor vehicle. For example, in circumstances in which a motor vehicle is high traffic, the motor vehicle system may use Bluetooth or other wireless communication with other vehicles nearby, or to link multiple vehicles together, and to share information in order to provide critical updates.

Figure 2:
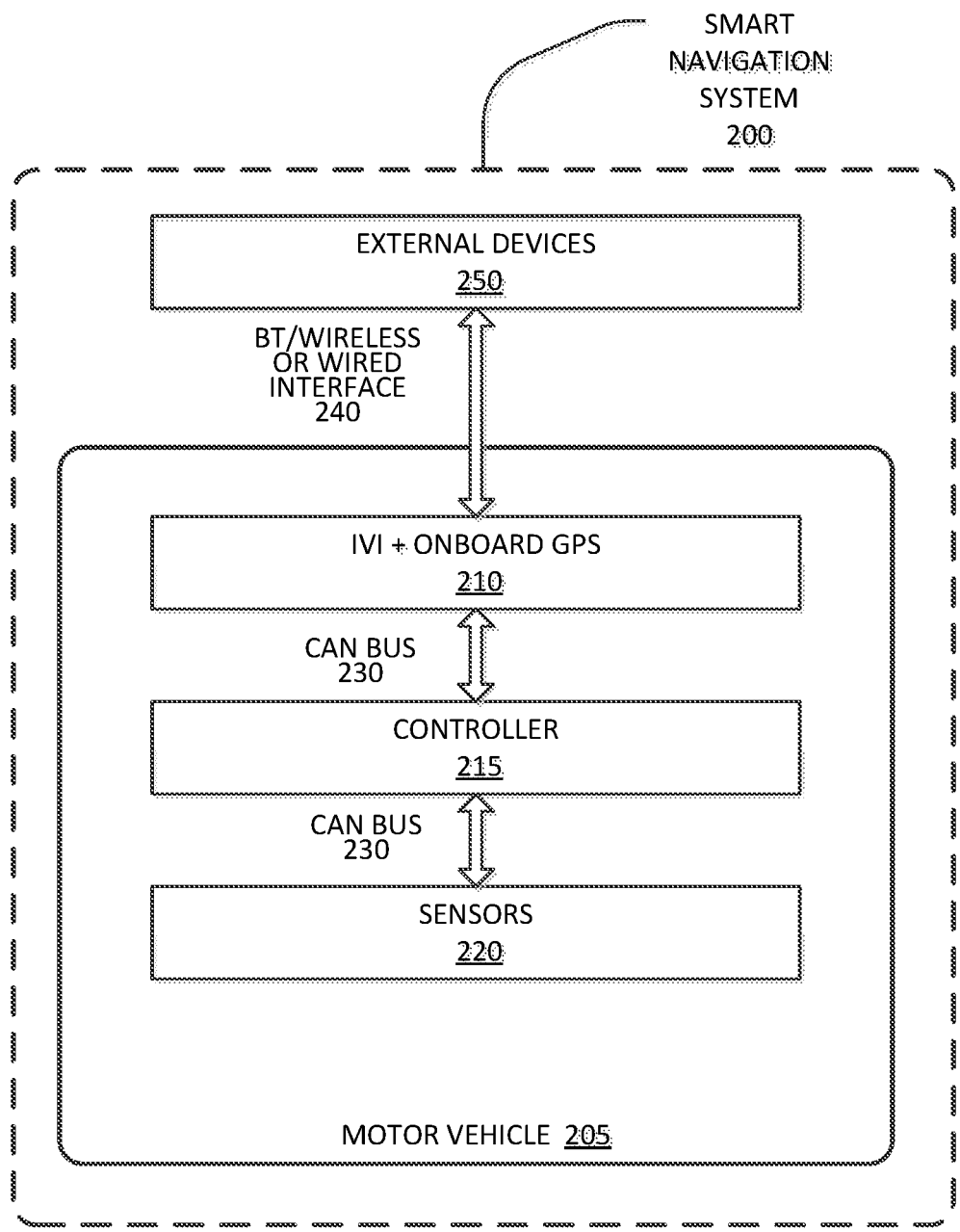
FIG. 2 is an illustration of a smart navigation system according to an embodiment.

FIG. 2 is an illustration of a smart navigation system according to an embodiment. In some embodiments, a smart navigation system includes elements of a motor vehicle 205, and may further utilize data of an external device 250, wherein the external device is in communication with elements of the motor vehicle by a wireless or wired interface 240, wherein a wireless interface may include, for example, a Bluetooth™ or other wireless link, and wherein a wired interface may include, for example, a link via a USB™ (Universal Serial Bus) connector or other wired connection.

In some embodiments, one or more on board sensors 220 of the motor vehicle 205 are to communicate with a vehicle controller 215 via a data connection, including, but not limited to, the Controller Area Network (CAN) bus of the motor vehicle 205, wherein the CAN bus is a vehicle bus standard that enables communications between microcontrollers and devices without requiring a host computer. In some embodiments, the controller 215 is to communicate with a navigation system via the CAN bus, wherein the navigation system may include an onboard GPS system incorporated with an electronics system of the motor vehicle, such as the vehicle IVI (In Vehicle Infotainment (IVI) system 210. In some embodiments, a motor vehicle 200 may further be in communication with one or more external devices 250, wherein the link with the one or more external devices may include a Bluetooth or other wireless link, or a wired linked via, for example, a USB (Universal Serial Bus) connector or other data connector.

In some embodiments, the on-board sensors 220 provide real-time data to the controller 215 over the CAN bus 230. In some embodiments, the IVI system 210 may be notified by the controller 215 receiving critical input from the sensors 220, or the IVI system may poll the controller for less critical input. In some embodiments, the input is forwarded to the GPS system, wherein the GPS system may be an on-board GPS system 210 or may utilize a GPS system contained in an external device 250, such as, for example, a smartphone or tablet.

Figure 3:
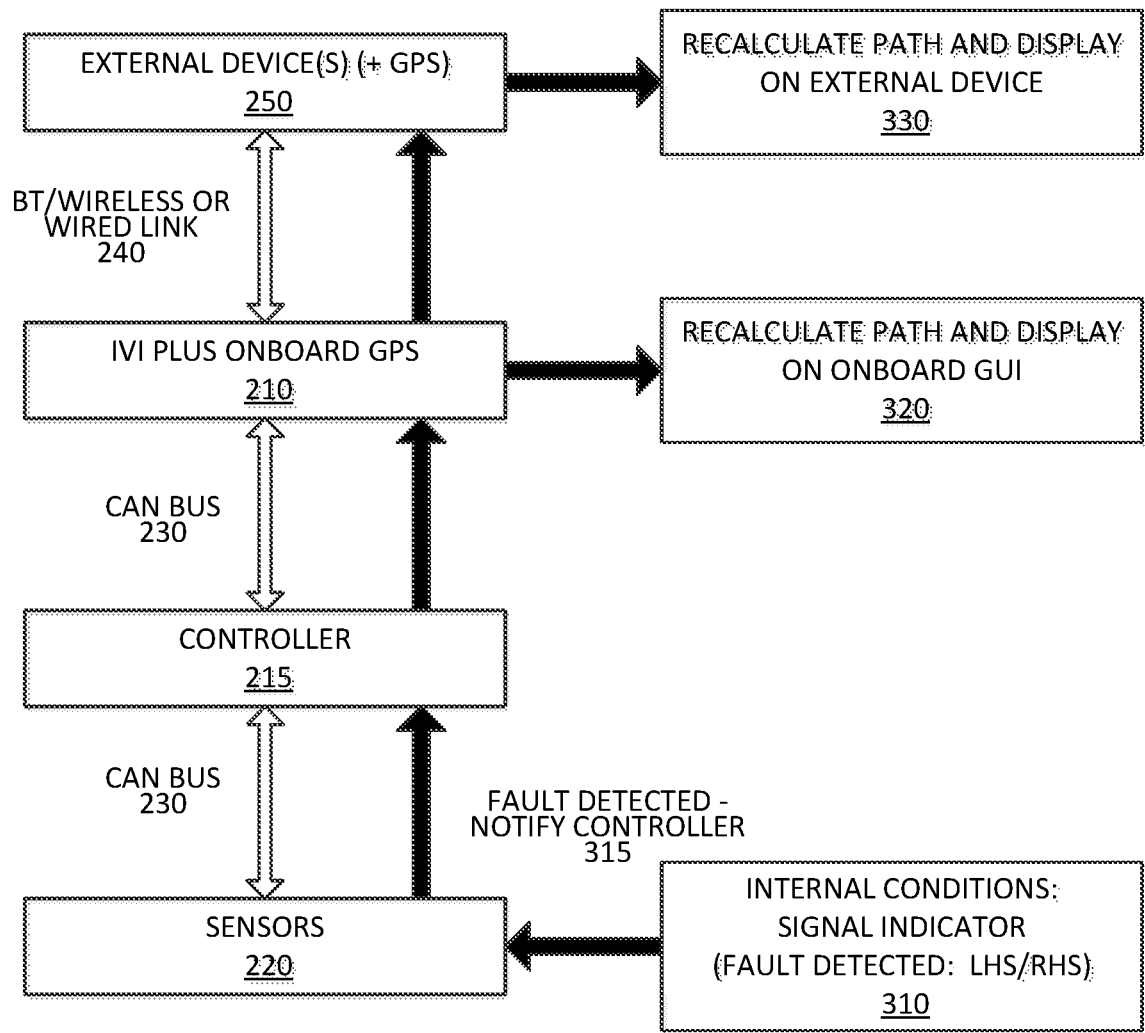
FIG. 3 illustrates a first example of navigation operation in a smart navigation system according to an embodiment.

In some embodiments, the navigation system utilizes the sensor data and other data for the purpose of generating a personalized smart navigation result for the operator of the motor vehicle, as illustrated in, for example, FIG. 2 or FIG. 3.

FIG. 3 illustrates a first example of navigation operation in a smart navigation system according to an embodiment. In some embodiments, motor vehicle sensors 220 may detect a motor vehicle fault 310. In an example, signal indicator sensors detect a fault with the signal indicators 310, which could relate to the LHS (Left Hand Side) signal indicator, RHS (Right Hand Side), or both, and the controller is notified of the vehicle fault 315 and may provide the fault data to the onboard GPS system 210 or external GPS system 250 (or other type of navigation system).

If the signal fault affects signal capability on both sides of the motor vehicle (such as in a complete signal failure), then the smart navigation system may advise the driver to stop because the total loss of signaling is a critical issue, but if the driver continues to drive, the smart navigation system may direct the driver to the service station via the GPS data, wherein a choice of service station and the route to the service station are optimized for the current conditions. The optimized route may include a service station on or near the route to the intended destination, wherein the choice of service station is not necessarily the nearest service station, but rather is chosen based on factors that may include the severity of the required repair; the hours of the service station and whether it is possible to reach the station before the station closes; and whether the service station is certified for the type of vehicle that is being operated. In circumstances in which only one side of the vehicle is affected (such in a failure of a particular signal light), either the left hand side or the right hand side, then the resulting fault may allow the vehicle to be operated with caution. In some embodiments, the smart navigation system may operate to recalculate the path taking the indicator fault into consideration, such as the on-board GPS 210 recalculating the path and displaying the path on the onboard GUI (Graphical User Interface) 320 or the external GPS 260 recalculating the path and displaying the path on the external device 330. In this instance, the smart navigation path may attempt to complete avoid turns to the faulty side, or, if such turns are not completely avoidable, to limit the number of turns towards the faulty side to a minimum.

Figure 4:
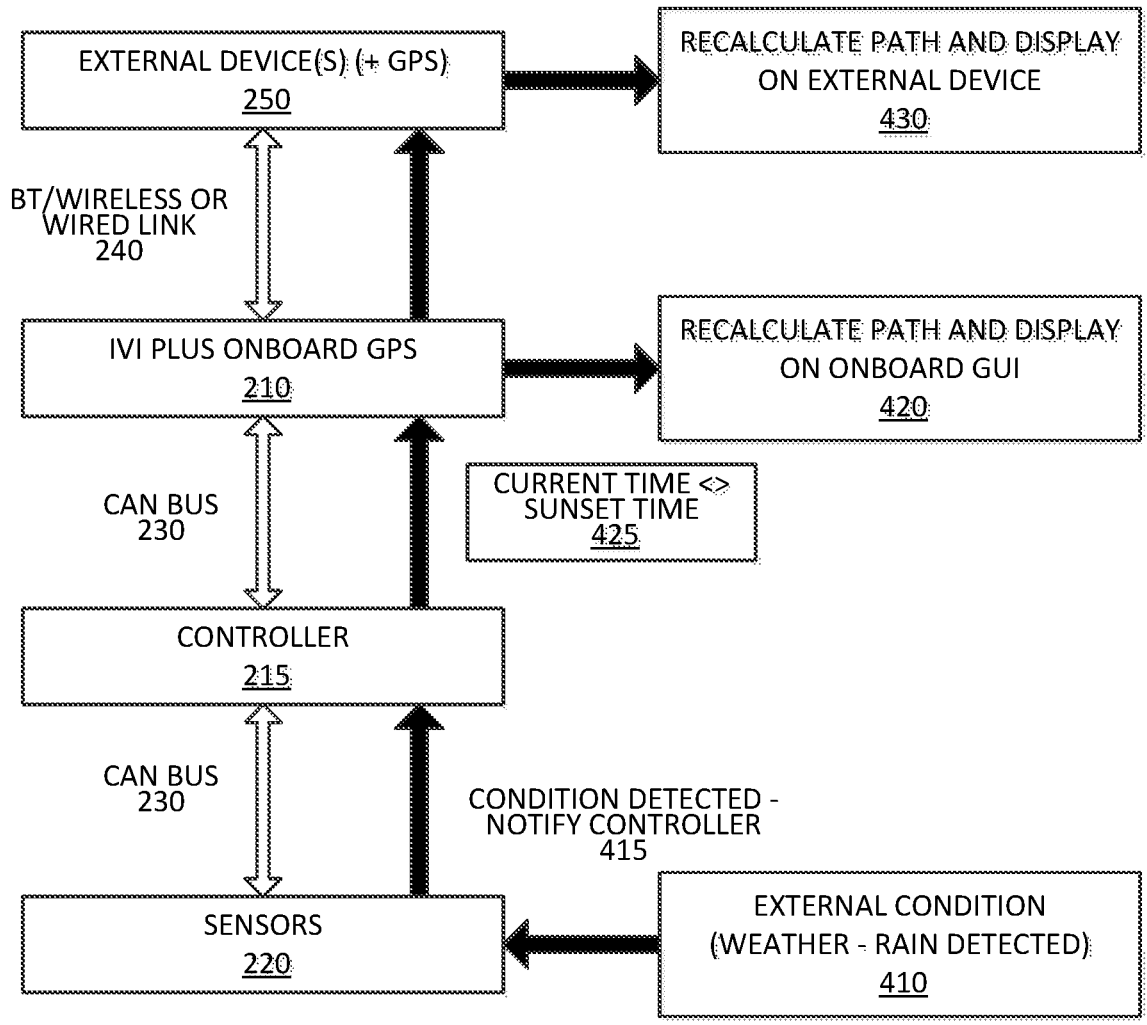
FIG. 4 illustrates a second example of navigation operation in a smart navigation system according to an embodiment.

FIG. 4 illustrates a second example of navigation operation in a smart navigation system according to an embodiment. In some embodiments, the vehicle sensors 220 may detect an external condition, such as a particular weather condition 410. In an example, sensors detect rain conditions, such as by detecting raindrops on the windshield of the motor vehicle, and the controller is notified of the condition 415. The detection of rainfall may include a severity of condition, such as when the rain is hard enough to significantly impact visibility or to generate concern regarding loss of traction by hydroplaning. In some embodiments, the controller 215 may provide the weather condition data to the onboard GPS system 210 or external GPS system 250. In some embodiments, the controller may further provide additional relevant data, such as data indicating that the current time is before or after sunset 425, which may affect the navigation choices.

In some embodiments, the smart navigation system may operate to recalculate the path taking the weather conditions into consideration, such as the on-board GPS 210 recalculating the path and displaying the path on the onboard GUI 420 or the external GPS 260 recalculating the path and displaying the path on the external device 430. In this instance, the smart navigation path may include avoiding highways operating at high speeds to allow vehicle operation at a reduced speed or to avoid minor roads and favor major roads, or, in severe conditions, the path may be intended to avoid the weather conditions by navigating around the path of the storm.

In some embodiments, an external condition 410 is considered in combination with an internal condition 310, such as a motor vehicle fault, in a recalculation of an optimized route. In an example, current weather conditions may be rainy, requiring that the windshield wipers are used. However, the windshield wipers for the vehicle are broken and, in the consideration of external vehicle conditions and internal vehicle conditions, a requirement for service of the windshield wipers may become a high priority item leading to a recalculation of route for immediate service, where the service requirement for the windshield wipers might otherwise be determined to be a low priority item that could be delayed if the external vehicle conditions include sunny weather.

An additional example of a combination of internal and external conditions may include darkness or fog, resulting in the headlights automatically turning on, wherein having one of the headlights being faulty may, because of the external vehicle conditions, require immediate service; or external conditions being heavy rain, and an internal conditions being a detection that tire pressure is low or that tires are in poor condition, wherein a recalculated optimized route may direct the operator to local roads rather than a highway if immediate service for the tire condition is not available.

In some embodiments, the sensing of an internal condition may also include the detection of faulty sensors, wherein the existence of the faulty sensor may mean that one or more vehicle conditions that are dangerous or that raise concern cannot be detected. In some embodiments, a system may utilize a combination of the detection of the faulty sensor together with knowledge of the implications of false readings to recalculate an optimized route for a motor vehicle. In one example, one or more sensors of a vehicle are determined to be faulty, and based at least on part on this information an optimized route to a service station is selected. In a particular example, if a faulty sensor is a proximity sensor or brake, then an optimized route may utilize less traveled streets to reduce the likelihood that a situation requiring hard braking is encountered. In another example, if the faulty sensor is a fuel sensor, the optimized route may direct the operator to take local roads with lower speed limits and the possibility of available stations providing fuel.

Figure 5:
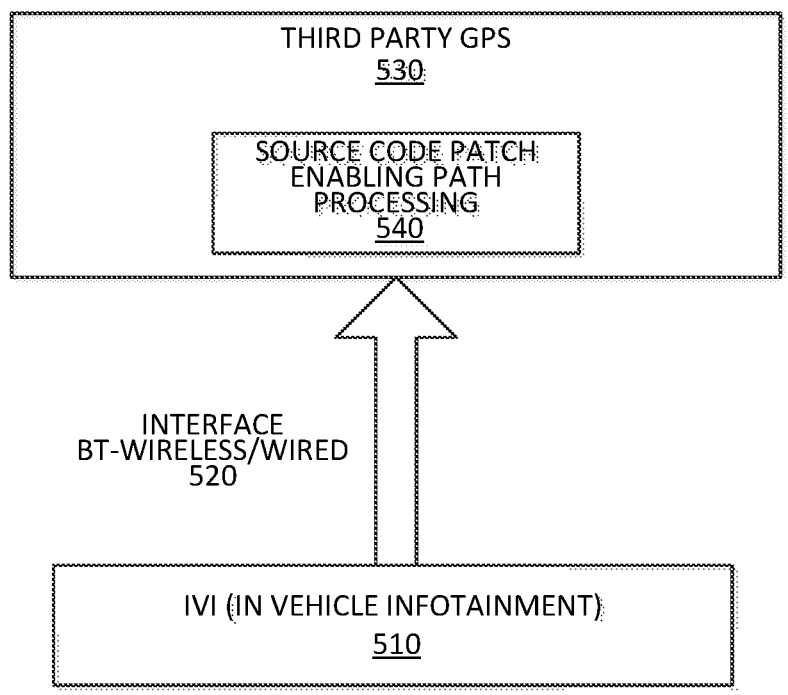
FIG. 5 illustrates implementation of personalized smart navigation according to an embodiment.

FIG. 5 illustrates implementation of personalized smart navigation according to an embodiment. In an implementation of personalized smart navigation, there may be a software requirement to implement the path recalculation, and input signal processing from, for example, a third party GPS manufacturer on-board. In some embodiments, in order to enable an external device such as a smartphone or tablet to support this feature, an appropriate Android/iOS application may be implemented, wherein hardware requirements may be met by existing infrastructure, in a wired link or a wireless link (such as Bluetooth).

For example, as illustrated in FIG. 5, a motor vehicle IVI system 510 may be linked to a third party GPS system 530 in an external device via a wired or wireless interface 520. In some embodiments, a source code patch is provide to enable smart navigation path process 540, thus allowing for smart navigation operation utilizing the third party GPS processing.

Figure 6:
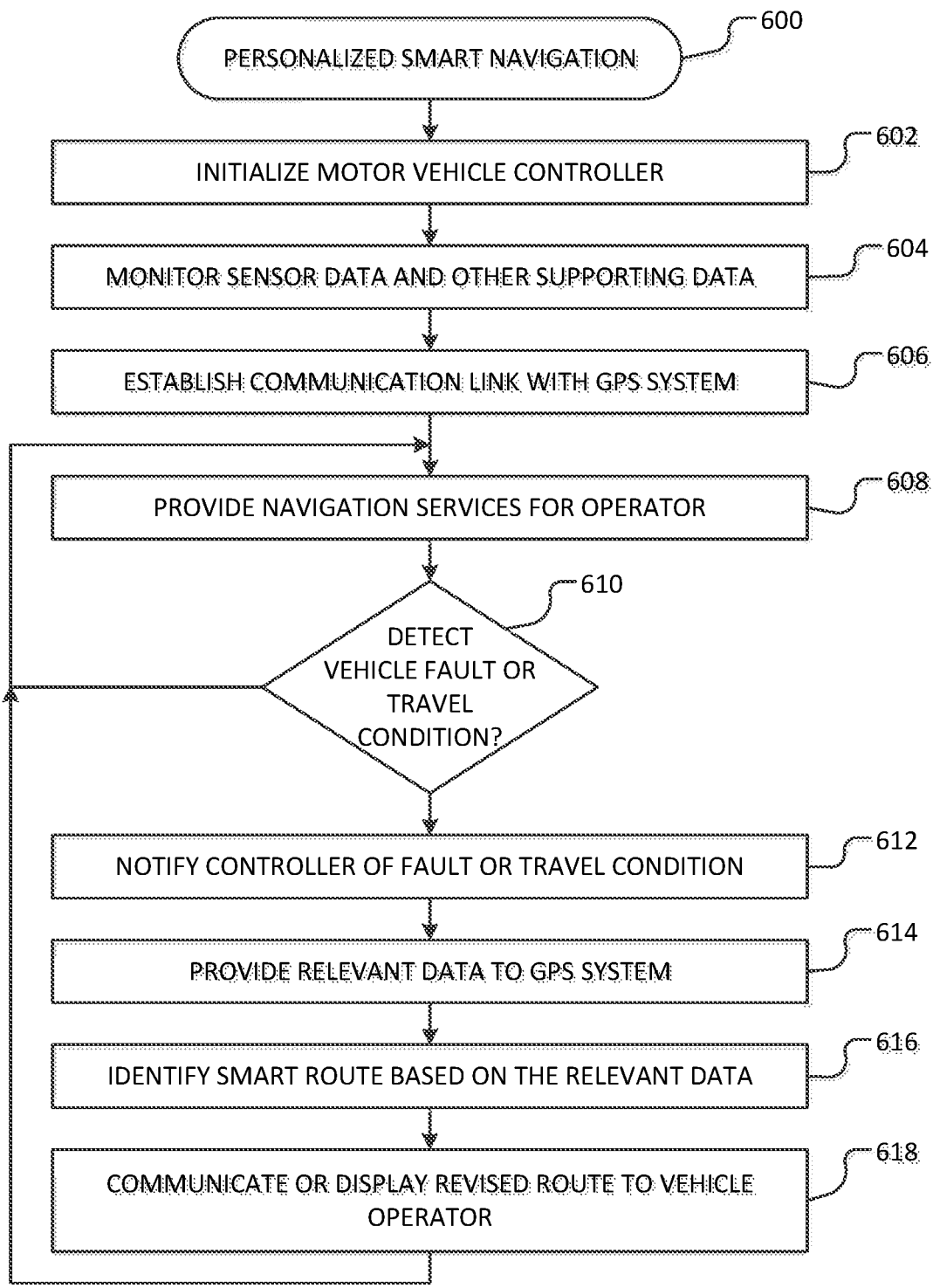
FIG. 6 is a flowchart to illustrate a process for personalized smart navigation according to an embodiment.

FIG. 6 is a flowchart to illustrate a process for personalized smart navigation according to an embodiment. In some embodiments, a personalized smart navigation process 600 to support the operator of a motor vehicle may include the following:

602: Initialize motor vehicle controller, such as controller 215 illustrated in FIGS. 2-4.

604: Monitor motor vehicle sensor data, such as data from sensors 220 illustrated in FIGS. 2-4, and other supporting data, including, for example, data received from external sources and personal data for the driver of the motor vehicle.

606: Establish communication with GPS system, wherein the GPS system may include an onboard GPS system or an external GPS system.

608: Provide navigation services for the operator of the motor vehicle.

610: Detection of a motor vehicle fault or other internal condition, such as the failure of a motor vehicle component or operation, an external condition, such as a weather condition, road condition, a driver condition, or any combination of such conditions.

612: Upon detection of a motor vehicle fault or an external condition, the controller is notified of the fault or condition.

614: Data regarding the motor vehicle fault or external condition is provided to the GPS system for recalculation of route.

616: The GPS system identifies an optimized route based at least in part on the relevant data regarding the internal conditions such as vehicle fault, external condition such as weather and other travel conditions, or any combination conditions.

618: The revised route is displayed or communicated to the operator of the motor vehicle.

Figure 7:
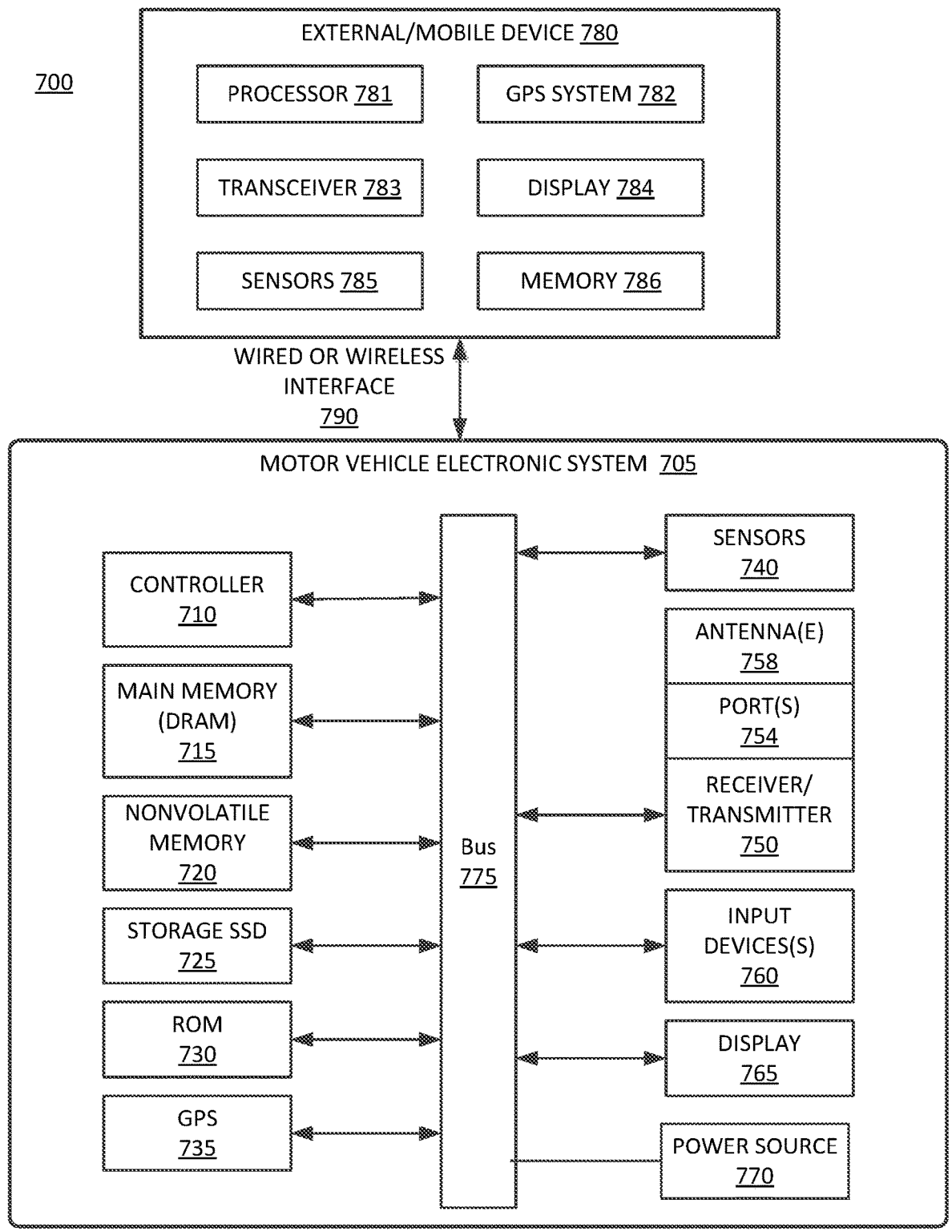
FIG. 7 is an illustration of a personalized smart navigation system for motor vehicles according to an embodiment.

FIG. 7 is an illustration of a personalized smart navigation system for motor vehicles according to an embodiment. In this illustration, certain standard and well-known components that are not germane to the present description are not shown. Elements shown as separate elements may be combined, including, for example, an SoC (System on Chip) combining multiple elements on a single chip.

In some embodiments, a smart navigation system 700 includes a motor vehicle electronics system 705, and may further utilize an external device such as a mobile device 780.

The motor vehicle electronics system 705 includes a processing means such as a controller 710 coupled to one or more buses or interconnects, shown in general as bus 775. The bus 775 is a communication means for transmission of data. The bus 775 is illustrated as a single bus for simplicity, but may represent multiple different interconnects or buses and the component connections to such interconnects or buses may vary. The bus 775 shown in FIG. 7 is an abstraction that represents any one or more separate physical buses, point-to-point connections, or both connected by appropriate bridges, adapters, or controllers. In some embodiments, bus 775 may include a CAN bus.

In some embodiments, the motor vehicle electronics system 705 further comprises a random access memory (RAM) or other dynamic storage device or element as a main memory 715 for storing information and instructions to be executed by the controller 710 and other elements. Main memory 715 may include, but is not limited to, dynamic random access memory (DRAM). The motor vehicle electronics system 705 may include a non-volatile memory 720; a storage device such as a solid state drive (SSD) 725; and a read only memory (ROM) 730 or other static storage device for storing static information and instructions for the controller 710 and other elements.

In some embodiments, the motor vehicle electronics system 705 may include an onboard GPS or other navigation system 735, such as a GPS system that is integrated with the IVI system of the motor vehicle.

In some embodiments, the motor vehicle electronics system 705 includes one or more sensors 740 for detecting motor vehicle faults, travel conditions, or both.

In some embodiments, the motor vehicle electronics system 705 includes one or more transmitters or receivers 750 coupled to the bus 775. In some embodiments, the motor vehicle electronics system 705 may include one or more antennae 758, such as dipole or monopole antennae, for the transmission and reception of data via wireless communication using a wireless transmitter, receiver, or both, and one or more ports 754 for the transmission and reception of data via wired communications. Wireless communication includes, but is not limited to, Bluetooth™, near field communication, and other wireless communication standards.

In some embodiments, the motor vehicle electronics system 705 includes one or more input devices 760 for the input of data, including hard and soft buttons, a joy stick, a mouse or other pointing device, a keyboard, voice command system, or gesture recognition system. In some embodiments, the motor vehicle electronics system 705 includes a display 756, such as a touch screen display, which may include a display utilized to display GPS data produced by the GPS system 735. In some embodiments, the input devices 760 and display 765 are integrated into the IVI system of the motor vehicle.

In some embodiments, the motor vehicle electronics system 705 includes a power source 770, which may include one or more motor vehicle batteries and charging elements.

In some embodiments, an external device 780, such as a mobile device, may be linked with the motor vehicle electronics system 705 by a wired or wireless interface 790. In some embodiments, the external device may include a processor 781 for processing of data; a GPS or other navigation system 782; a transceiver 783 for transmission and reception of data; a display 784, which may include display of GPS data; one or more sensors 785; and memory 786 for the storage of data.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

A smart navigation system for a motor vehicle including a plurality of sensors of the motor vehicle to detect and generate sensor data for internal conditions, external conditions, or both for the motor vehicle; a controller to receive the sensor data from the plurality of sensors and to provide current conditions data based at least in part on the sensor data; and a navigation system to determine a route for an operator of the motor vehicle, wherein determination of the route by the navigation system is based at least in part on current conditions data received from a plurality of sources, the current conditions data including navigation data for the navigation system and the current conditions data provided by the controller.

In some embodiments, the navigation system is a GPS (Global Positioning System) system.

In some embodiments, the navigation system is a part of an electronics system of the motor vehicle. In some embodiments, the navigation system is a part of an In Vehicle Infotainment (IVI) system of the motor vehicle.

In some embodiments, the navigation system utilizes an external device that is to be linked by a wireless or wired interface with the motor vehicle.

In some embodiments, the internal conditions data includes data regarding a motor vehicle fault, and wherein a route determined by the navigation system is a route selected at least in part to address the motor vehicle fault.

In some embodiments, the route is selected at least in part to reduce usage of a faulty motor vehicle component.

In some embodiments, the current conditions data includes data regarding an external condition for the motor vehicle, and wherein a route determined by the navigation system is a route selected at least in part to address the external condition. In some embodiments, the external condition is one of a hazardous weather condition or a road condition, and wherein the route is selected at least in part to avoid the hazardous weather condition or road condition.

In some embodiments, an operator of the motor vehicle is either a human driver or an automated operator. In some embodiments, the current conditions data further includes data regarding condition of the human driver. In some embodiments, data regarding condition of the human driver includes one or more of data regarding medical conditions and physical limitations of the driver and data regarding operation of the motor vehicle by the driver.

In some embodiments, a method includes monitoring sensor data for a motor vehicle; detecting an internal condition or external condition for the motor vehicle; notifying a motor vehicle controller regarding the internal condition or external condition; providing by the controller current conditions data to a navigation system, the current conditions data being based at least in part on the detected internal condition or external condition; and determining a route by the navigation system based at least in part on current conditions data received from a plurality of sources, the current conditions data including navigation data for the navigation system and the current conditions data provided by the controller.

In some embodiments, the navigation system is a GPS (Global Positioning System) system.

In some embodiments, the internal condition includes a failure of a motor vehicle component.

In some embodiments, the method further includes providing information regarding the route to an operator of the motor vehicle.

In some embodiments, the operator of the motor vehicle is either a human driver or an automated operator.

In some embodiments, the current conditions data further includes data regarding a condition of the human driver.

In some embodiments, the navigation system is a part of an electronics system of the motor vehicle.

In some embodiments, the navigation system utilizes an external device that is to be linked by a wireless or wired interface with the motor vehicle.

In some embodiments, determination of the route includes selecting a route based at least in part on reducing usage of a detected faulty motor vehicle component.

In some embodiments, determination of the route includes selecting a route based at least in part on avoiding a detected external condition.

In some embodiments, one or more non-transitory computer-readable storage mediums have stored thereon data representing sequences of instructions that, when executed by one or more processors, cause the one or more processors to perform operations including monitoring sensor data for a motor vehicle; detecting a motor vehicle fault condition or external condition for the motor vehicle; notifying a motor vehicle controller regarding the fault condition or external condition; determining current conditions data based at least in part on the detected fault condition or external condition; and providing a route to an operator of the motor vehicle, wherein a determination of the route is based at least in part on current conditions data received from a plurality of sources, the current conditions data including navigation data and the current conditions data provided by the controller.

In some embodiments, determination of the route is based at least in part on reducing usage of a detected faulty motor vehicle component.

In some embodiments, determination of the route is based at least in part on avoiding a detected external condition.

In some embodiments, an apparatus includes means for monitoring sensor data for a motor vehicle; means for detecting a motor vehicle fault condition or external condition for the motor vehicle; means for notifying a motor vehicle controller regarding the fault condition or external condition; means for determining current conditions data based at least in part on the detected fault condition or external condition; and means for providing a route to an operator of the motor vehicle, wherein a determination of the route is based at least in part on current conditions data received from a plurality of sources, the current conditions data including navigation data and the current conditions data provided by the controller.

In some embodiments, determination of the route is based at least in part on reducing usage of a detected faulty motor vehicle component.

In some embodiments, determination of the route is based at least in part on avoiding a detected external condition.

What is claimed is:

1. A method comprising:
    detecting and generating sensor data for a motor vehicle;
    detecting, from the sensor data, one or more of an internal condition that includes a fault of a signal indicator of the motor vehicle using a signal indicator sensor or an external condition for the motor vehicle;
    providing, by a controller, current conditions data to a navigation system, the current conditions data based on one or more of the internal condition indicating the fault of the signal indicator or the external condition; and
    determining a route, by the navigation system, based on the current conditions data, the current conditions data including navigation data, the route to reduce usage of the signal indicator with the fault.

2. The method of claim 1, wherein the route is based on avoiding a detected external condition.

3. The method of claim 1, wherein the navigation system includes a GPS (Global Positioning System).

4. The method of claim 1, wherein the internal condition includes a failure of a motor vehicle component.

5. The method of claim 1, further including providing information regarding the route to an operator of the motor vehicle.

6. The method of claim 5, wherein an operator of the motor vehicle is an automated operator.

7. The method of claim 5, wherein the operator of the motor vehicle is a human driver.

8. The method of claim 7, wherein the current conditions data further includes data regarding a condition of the human driver.

9. The method of claim 1, wherein the navigation system is a part of an electronics system of the motor vehicle.

10. The method of claim 1, wherein the navigation system is to utilize an external device that is to be linked by a wireless or wired interface with the motor vehicle.

11. A non-transitory computer-readable storage medium having instructions that, when executed by one or more processors, cause the one or more processors to at least:
    monitor sensor data for a motor vehicle;
    detect at least one of a motor vehicle fault condition or an external condition for the motor vehicle, wherein the motor vehicle fault condition includes a fault of a signal indicator of the motor vehicle that is detected using a signal indicator sensor coupled to the motor vehicle;
    determine current conditions data based on one or more of the fault condition or the external condition; and
    provide a route to an operator of the motor vehicle, the route being based on current conditions data, the current conditions data including navigation data, and wherein the route is to reduce usage of the signal indicator with the fault.

12. The storage medium of claim 11, wherein the route is based on avoiding a detected external condition.

13. A smart navigation system for a motor vehicle comprising:
    a plurality of sensors to detect and generate sensor data for at least one of internal conditions or external conditions for the motor vehicle, the plurality of sensors including a signal indicator sensor to detect a fault of a signal indicator of the motor vehicle;

a controller to receive the sensor data from the plurality of sensors and to provide current conditions data based at least in part on the sensor data indicating the fault of the signal indicator; and a navigation system to determine a route for an operator of the motor vehicle, the route based at least in part on the current conditions data, the current conditions data including navigation data for the navigation system, wherein the route is to reduce usage of the signal indicator with the fault.

14. The system of claim 13, wherein the navigation system includes a GPS (Global Positioning System).

15. The system of claim 13, wherein the navigation system is a part of an electronics system of the motor vehicle.

16. The system of claim 15, wherein the navigation system is a part of an In Vehicle Infotainment (IVI) system of the motor vehicle.

17. The system of claim 13, wherein the navigation system is to utilize an external device that is to be linked by a wireless or wired interface with the motor vehicle.

18. The system of claim 13, wherein the current conditions data includes data regarding an external condition of the motor vehicle, and wherein the route determined by the navigation system is to address the external condition.

19. The system of claim 18, wherein the external condition is at least one of a hazardous weather condition or a road condition, and wherein the route is to avoid the hazardous weather condition or road condition.

20. The system of claim 13, wherein an operator of the motor vehicle is an automated operator.

21. The system of claim 13, wherein an operator of the motor vehicle is a human driver.

22. The system of claim 21, wherein the current conditions data includes data regarding condition of the human driver.

23. The system of claim 22, wherein data regarding condition of the human driver includes data regarding one or more of a medical condition of the driver, a physical limitation of the driver, or operation of the motor vehicle by the driver.

* * * * *